United States Patent
Ali Khan et al.

(10) Patent No.: US 11,014,547 B1
(45) Date of Patent: May 25, 2021

(54) EXHAUST BRAKE TORQUE SYSTEMS

(71) Applicant: GM GLOBAL TECHNOLOGY OPERATIONS LLC, Detroit, MI (US)

(72) Inventors: Maqsood Rizwan Ali Khan, Troy, MI (US); Mark R. Claywell, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/706,993

(22) Filed: Dec. 9, 2019

(51) Int. Cl.
*B60W 10/198* (2012.01)
*B60W 40/12* (2012.01)
*B60W 50/14* (2020.01)

(52) U.S. Cl.
CPC .......... *B60W 10/198* (2013.01); *B60W 40/12* (2013.01); *B60W 2050/146* (2013.01); *B60W 2510/0633* (2013.01); *B60W 2510/0638* (2013.01)

(58) Field of Classification Search
CPC ............... B60W 10/198; B60W 40/12; B60W 2510/0638; B60W 2050/146; B60W 2510/0633
See application file for complete search history.

(56) References Cited

U.S. PATENT DOCUMENTS

| | | | |
|---|---|---|---|
| 7,145,442 B1* | 12/2006 | Wai | B60R 16/0231 340/438 |
| 9,175,617 B2 | 11/2015 | Scavone et al. | |
| 2012/0179347 A1* | 7/2012 | Aldighieri | B60W 50/0097 701/70 |
| 2014/0046526 A1* | 2/2014 | Oikawa | B60W 10/08 701/22 |
| 2016/0075342 A1* | 3/2016 | Shimizu | B60W 50/14 701/54 |
| 2019/0366989 A1* | 12/2019 | James | B60T 7/20 |

\* cited by examiner

*Primary Examiner* — Joseph J Dallo

(57) ABSTRACT

An exhaust brake torque system for a vehicle including an engine includes a controller configured to determine a current exhaust brake torque and a maximum exhaust brake torque. A display is configured to display at least one of the current exhaust brake torque, the maximum exhaust brake torque and a percentage corresponding to the current exhaust brake torque divided by the maximum exhaust brake torque. An engine speed sensor determines an engine speed of an engine. A pressure sensor is configured to sense turbine inlet pressure. The controller is configured to calculate the current exhaust brake torque and the maximum exhaust brake torque in response to the engine speed and the turbine inlet pressure.

17 Claims, 4 Drawing Sheets

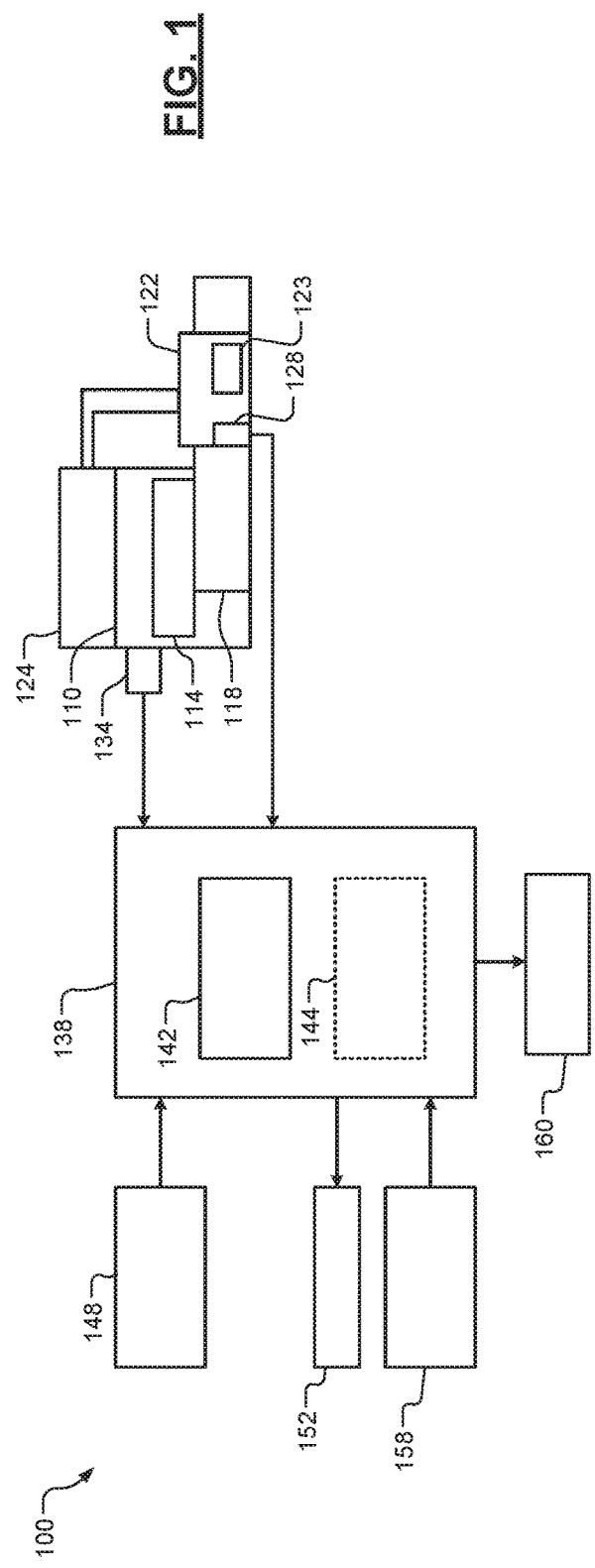
FIG. 1
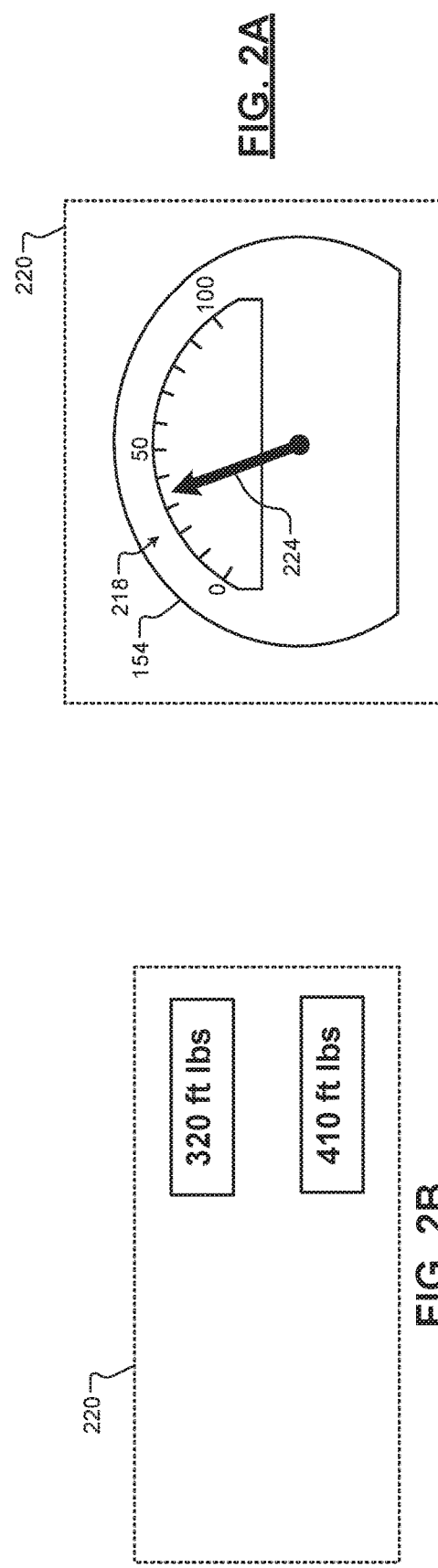
FIG. 2A
FIG. 2B

EXHAUST BRAKE TORQUE SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to exhaust brake torque systems.

Exhaust brake torque systems can be used to slow vehicles. For example, exhaust brake torque may be used to slow vehicles or trucks including diesel engines. The exhaust brake torque systems restrict an exhaust path of the diesel engine causing compression of exhaust gases in the exhaust manifold and cylinders of the diesel engine. When the exhaust is being compressed and no fuel is supplied to the cylinders, the engine can be used to slow the vehicle down. The amount of negative torque that is generated is related to the back pressure of the engine.

The exhaust brake torque systems include a flow control device that selectively restricts the exhaust system to create the exhaust back pressure, which retards engine speed. The flow control device removes the restriction in the exhaust system when engine braking is disabled.

The exhaust brake torque system can be used for supplemental braking. For example, the exhaust brake torque can be used to slow a loaded vehicle on a moderate downgrade without the need to apply mechanical brakes. However, higher loads and/or higher downgrades may also require mechanical braking.

SUMMARY

An exhaust brake torque system for a vehicle including an engine includes a controller configured to determine a current exhaust brake torque and a maximum exhaust brake torque. A display is configured to display at least one of the current exhaust brake torque, the maximum exhaust brake torque and a percentage corresponding to the current exhaust brake torque divided by the maximum exhaust brake torque.

In other features, an engine speed sensor determines an engine speed of an engine. The controller is configured to calculate the current exhaust brake torque and the maximum exhaust brake torque in response to the engine speed. A pressure sensor is configured to sense turbine inlet pressure. The controller is configured to calculate the current exhaust brake torque and the maximum exhaust brake torque in response to the turbine inlet pressure.

In other features, a pressure sensor is configured to sense turbine inlet pressure. An engine speed sensor determines an engine speed of an engine. The controller is configured to calculate the current exhaust brake torque and the maximum exhaust brake torque in response to the turbine inlet pressure and the engine speed.

In other features, an engine speed sensor determines an engine speed of an engine.

The controller further comprises a lookup table. The controller is configured to determine the current exhaust brake torque and the maximum exhaust brake torque by indexing the lookup table using the engine speed.

In other features, a pressure sensor determines a turbine inlet pressure. The controller further comprises a lookup table. The controller is configured to determine the current exhaust brake torque and the maximum exhaust brake torque by indexing the lookup table using the turbine inlet pressure.

In other features, the controller is further configured to receive an exhaust brake torque setpoint and to selectively apply mechanical brakes of the vehicle in response to the current exhaust brake torque exceeding the exhaust brake torque setpoint. The controller is further configured to selectively release the mechanical brakes of the vehicle in response to the current exhaust brake torque exceeding the exhaust brake torque setpoint minus a predetermined exhaust brake torque delta.

In other features, the controller is further configured to control a vehicle speed of the vehicle to a vehicle speed setpoint of a cruise control system using exhaust brake torque of the exhaust brake torque system and mechanical brakes of the vehicle. The controller is further configured to receive an exhaust brake torque setpoint and when the vehicle speed is greater than the vehicle speed setpoint, selectively apply the mechanical brakes of the vehicle in response to the current exhaust brake torque exceeding the exhaust brake torque setpoint.

In other features, the controller is further configured to selectively release the mechanical brakes of the vehicle in response to the current exhaust brake torque exceeding the exhaust brake torque setpoint minus a predetermined exhaust brake torque delta.

A method includes determining a current exhaust brake torque and a maximum exhaust brake torque. The method includes displaying at least one of the current exhaust brake torque, the maximum exhaust brake torque and a percentage corresponding to the current exhaust brake torque divided by the maximum exhaust brake torque.

In other features, the method includes determining at least one of an engine speed of an engine and a turbine inlet pressure and calculating the current exhaust brake torque and the maximum exhaust brake torque in response to the at least one of the engine speed and the turbine inlet pressure. The method includes determining at least one of an engine speed of an engine and a turbine inlet pressure and determining the current exhaust brake torque and the maximum exhaust brake torque by indexing a lookup table using the at least one of the engine speed and the turbine inlet pressure.

In other features, the method includes receiving an exhaust brake torque setpoint and selectively applying mechanical brakes of the vehicle in response to the current exhaust brake torque exceeding the exhaust brake torque setpoint. The method includes selectively releasing the mechanical brakes of the vehicle in response to the current exhaust brake torque exceeding the exhaust brake torque setpoint minus a predetermined exhaust brake torque delta.

In other features, the method includes controlling a vehicle speed of the vehicle to a vehicle speed setpoint of a cruise control system using exhaust brake torque of the exhaust brake torque system and mechanical brakes of the vehicle. The method includes receiving an exhaust brake torque setpoint, and when the vehicle speed is greater than the vehicle speed setpoint, selectively applying the mechanical brakes of the vehicle in response to the current exhaust brake torque exceeding the exhaust brake torque setpoint. The method includes selectively releasing the mechanical brakes of the vehicle in response to the current exhaust brake torque exceeding the exhaust brake torque setpoint minus a predetermined exhaust brake torque delta.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of an example of an engine control system and an exhaust brake torque control system for a vehicle according to the present disclosure;

FIGS. 2A and 2B illustrate examples of exhaust brake torque displays according to the present disclosure;

In the drawings, reference numbers may be reused to identify similar and/or identical elements.

DETAILED DESCRIPTION

Figure 3:
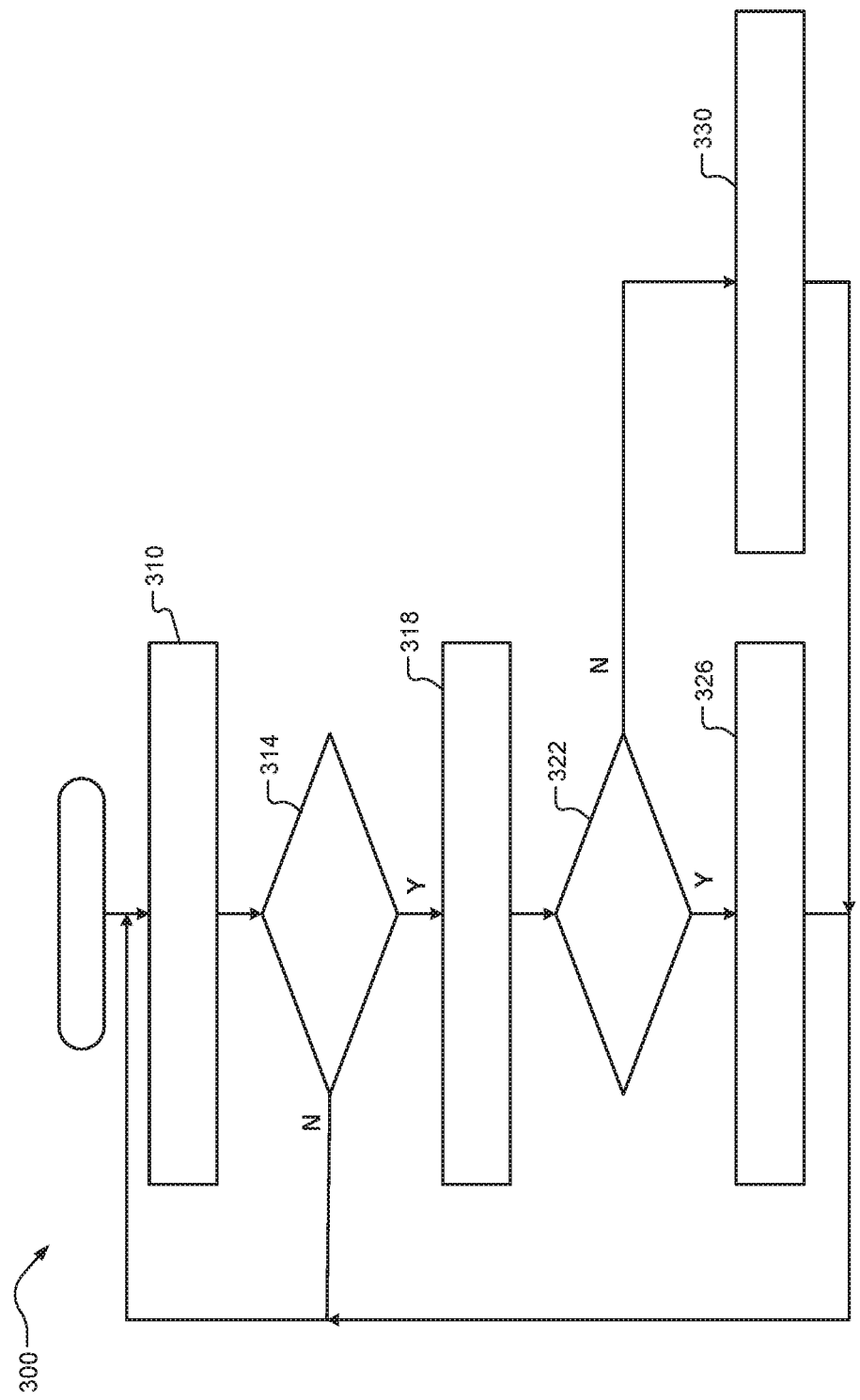
FIG. 3 is a flowchart of an example of a method for displaying exhaust brake torque according to the present disclosure.

The present disclosure relates to systems and methods for calculating, monitoring, displaying, controlling vehicle speed and/or otherwise using exhaust brake torque. The systems and methods calculate and display exhaust brake torque to alert an operator of a vehicle and to allow manual and/or automatic mechanical braking. In some examples, the exhaust brake torque display outputs data only when the operator engages the exhaust brake torque system.

In some examples, the exhaust brake torque calculation is based on a formula, function, lookup table and combinations thereof. For example, exhaust brake torque can be calculated as a function of engine RPM and/or turbine inlet pressure. In other examples, the exhaust brake torque for the engine can be stored in a lookup table developed during calibration of the engine. The exhaust brake torque display outputs current, maximum exhaust brake torque and/or a percentage of maximum available exhaust brake torque.

Referring now to FIG. 1, an engine control system 100 is shown. The engine control system includes an engine 110 having a plurality of cylinders 114. An exhaust manifold 118 receives exhaust gas output by the cylinders. In some examples, a flow restriction can be introduced by a turbocharger 122 such as a variable geometry turbo (VGT). The turbocharger 122 uses the exhaust gases to spin a turbine in the turbocharger 122. The turbocharger 122 pressurizes intake air which is supplied to an intake and throttle assembly 124. As can be appreciated, the turbocharger 122 may include variable vanes 123 that can be used to selectively create and/or remove a flow restriction. While a system including a VGT is shown, other methods for introducing a flow restriction in the exhaust system are contemplated.

In some examples, a pressure sensor 128 senses pressure at a turbine inlet of the turbocharger 122. The measured pressure value is indicative of exhaust back pressure and exhaust brake torque. In some examples, an engine speed sensor 134 such as a crankshaft sensor senses an engine speed (e.g. in revolutions per minute (rpm)) of the engine 110.

A controller 138 receives an output of the engine speed sensor 134 and/or the pressure sensor 128. In some examples, the controller 138 includes an exhaust brake torque module 142 that estimates exhaust brake torque based upon the engine speed and/or the turbine inlet pressure. In some examples, the exhaust brake torque module 142 includes one or more formulas, functions, lookup tables and/or models that allow the exhaust brake torque to be determined based upon the engine speed and/or the turbine inlet pressure. An example of a model or set of formulas for calculating the exhaust brake torque can be found in commonly-assigned U.S. Pat. No. 9,175,617, filed on Aug. 8, 2013 and entitled "System and Method for Controlling Exhaust Braking in a Vehicle", which is hereby incorporated by reference in its entirety.

In some examples, the controller 138 includes an exhaust brake torque lookup table (LUT) 144 storing exhaust brake torque values indexed by the engine speed, the turbine inlet pressure, and/or another vehicle parameter. In some examples, values in the exhaust brake torque LUT 144 can be determined during engine development and/or calibration.

The engine control system 100 further includes a cruise control system 148 including a user input device (not shown) to allow a user to enable and disable the cruise control system 148, to set a cruise control speed setpoint and/or to increase, decrease or cancel the speed setpoint.

An exhaust brake torque display 154 provides a visual indication of the current exhaust brake torque as a function of the maximum exhaust brake torque for the vehicle. In some examples, the exhaust brake torque display 154 shows a percentage of the maximum exhaust brake torque for the vehicle. In other examples, the display shows a current value of the exhaust brake torque and the maximum exhaust brake torque for the vehicle. An exhaust brake torque input device 158 includes one or more switches, knobs, touchpads, and/or other devices to allow an operator to enable or disable exhaust brake torque. In some examples, the exhaust brake torque input device 158 also allows an operator to enter an exhaust brake torque setpoint (value or percentage of maximum exhaust brake torque). In some examples, the controller 138 selectively actuates mechanical brakes 160 as will be described further below.

Referring now to FIGS. 2A and 2B, examples of the exhaust brake torque display are shown. The exhaust brake torque display 154 can be arranged on the instrument panel 220, as part of a heads-up display, or at another location visible to the operator of the vehicle. In FIG. 2A, the exhaust brake torque display 154 includes a scale 218 defining a range of exhaust brake torque values or percentages. The exhaust brake torque display 214 includes a needle or other indicator 224 that identifies the current exhaust brake torque value or percentage. In FIG. 2B, the exhaust brake torque display 154 outputs a current exhaust brake torque value and/or a maximum exhaust brake torque value.

Referring now to FIG. 3, a method 300 for displaying exhaust brake torque is shown. At 310, the engine speed, engine load, and/or pressure (e.g. turbine inlet pressure) are monitored. At 314, the method determines whether the exhaust is in an engine braking mode. If 314 is true, the method continues at 318 and determines the current exhaust brake torque. At 322, the method determines whether the absolute exhaust brake torque is to be displayed. If 322 is true, the exhaust brake torque value and/or the maximum exhaust brake torque are displayed at 326. If 322 is false, the exhaust brake torque is displayed as a percentage of the total available exhaust brake torque at 330.

Figure 4:
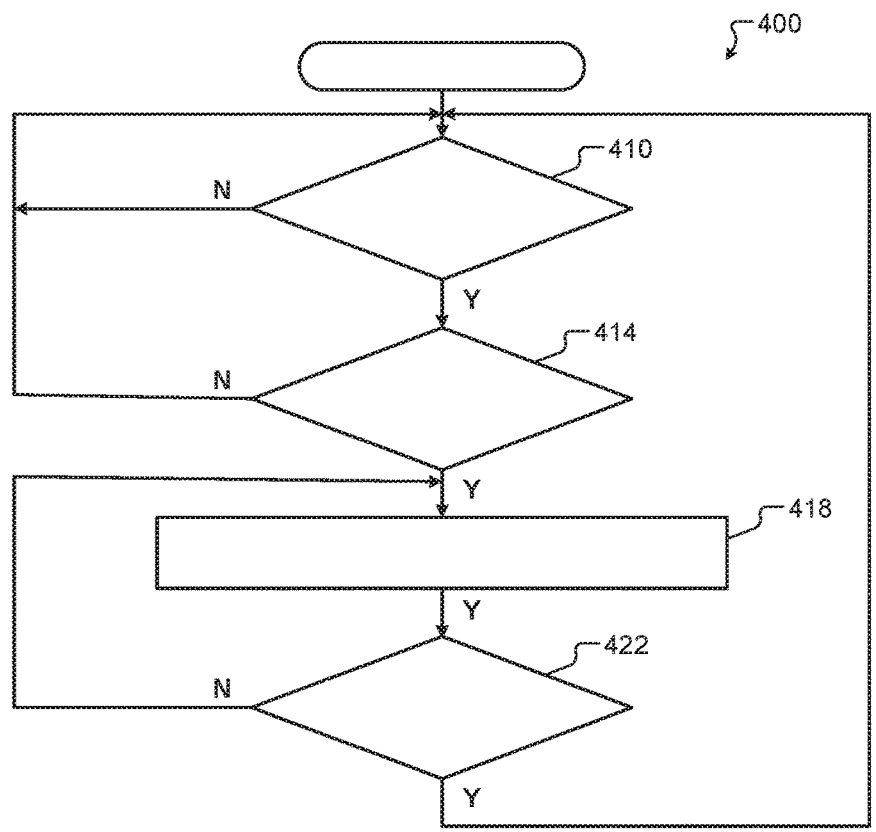
FIG. 4 is functional block diagram of an example of a method for setting an exhaust brake torque value and selectively modulating mechanical brakes according to the present disclosure.

Referring now to FIG. 4, a method 400 for setting an exhaust brake torque value and modulating the mechanical brakes is shown. In some examples, the operator of the vehicle may set a predetermined exhaust brake torque (value or percentage). The mechanical brakes are periodically applied when the exhaust brake torque exceeds the predetermined exhaust brake torque and released when the exhaust brake torque falls below a second exhaust brake torque value. In some examples, the operator of the vehicle can use this approach to control speed on downhill grades using exhaust brake torque and the mechanical brakes without exceeding the desired exhaust brake torque level and without overheating the mechanical brakes (by applying them for an extended period).

At 410, the method determines whether the vehicle is in exhaust brake mode. If 410 is false, the method returns to 410. If 410 is true, the method determines at 414 whether the exhaust brake torque is greater than a predetermined exhaust brake torque setpoint $T_{setpoint}$. If 414 is false, the method returns to 410. If 414 is true, the method applies the mechanical brakes at 418. At 422, the method determines whether the exhaust brake torque is greater than $T_{setpoint}$ minus a predetermined exhaust brake torque delta value (A). If 422 is true, the method returns to 410. If 422 is false, the method returns to 418.

As can be appreciated, a combination of mechanical braking and exhaust brake torque can be used to slow the vehicle during a descent on a downhill grade without overheating the mechanical brakes or exceeding the maximum brake torque of the engine. By modulating the mechanical brakes on and off, a particular exhaust brake torque setpoint can be maintained. As a result, vehicle speed may also be maintained in a predetermined range.

Figure 5:
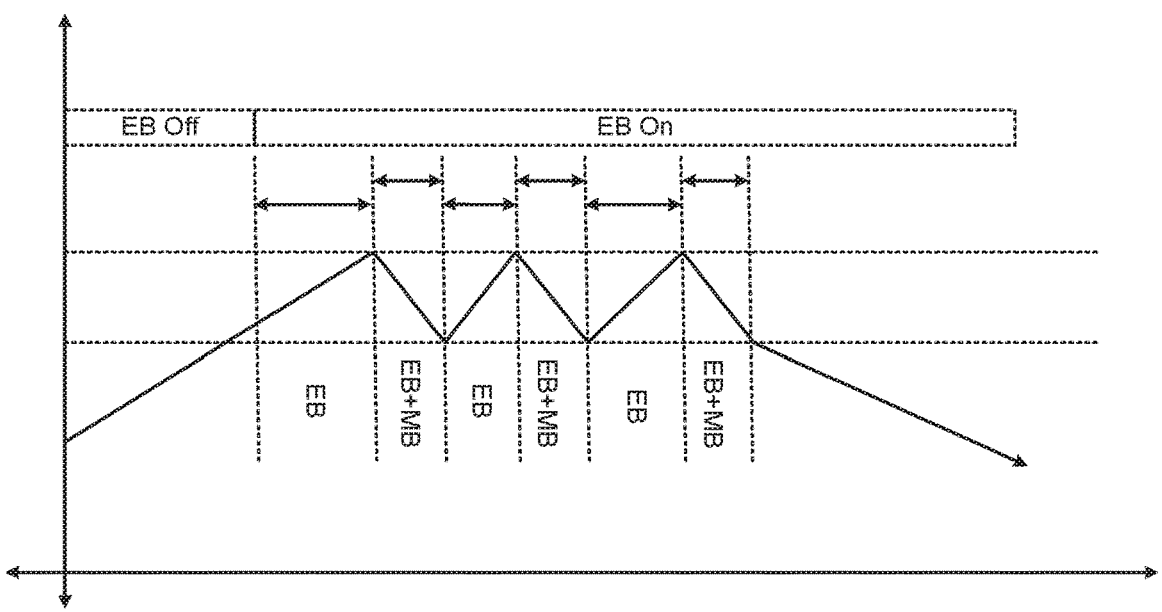
FIG. 5 is a graph illustrating an example of exhaust brake torque percentage as a function of time when the vehicle is travelling on a downhill grade according to the present disclosure.

Referring now to FIG. 5, an example of the exhaust brake torque percentage is shown as a function of time. When the exhaust brake torque system is turned on, the vehicle is initially slowed by the exhaust brake torque. If the vehicle is loaded and/or on a steep grade, the exhaust brake torque may be insufficient to slow the vehicle and may continue to increase until a predetermined exhaust brake torque percentage or value is reached. When the predetermined exhaust brake torque percentage or value is reached, the mechanical brakes are applied by the controller in addition to the exhaust brake torque to further slow the vehicle until $T_{setpoint}-\Delta$ is reached. Then, the mechanical brakes are released (until the exhaust brake torque is greater than $T_{setpoint}$ and then the process is repeated).

Figure 6:
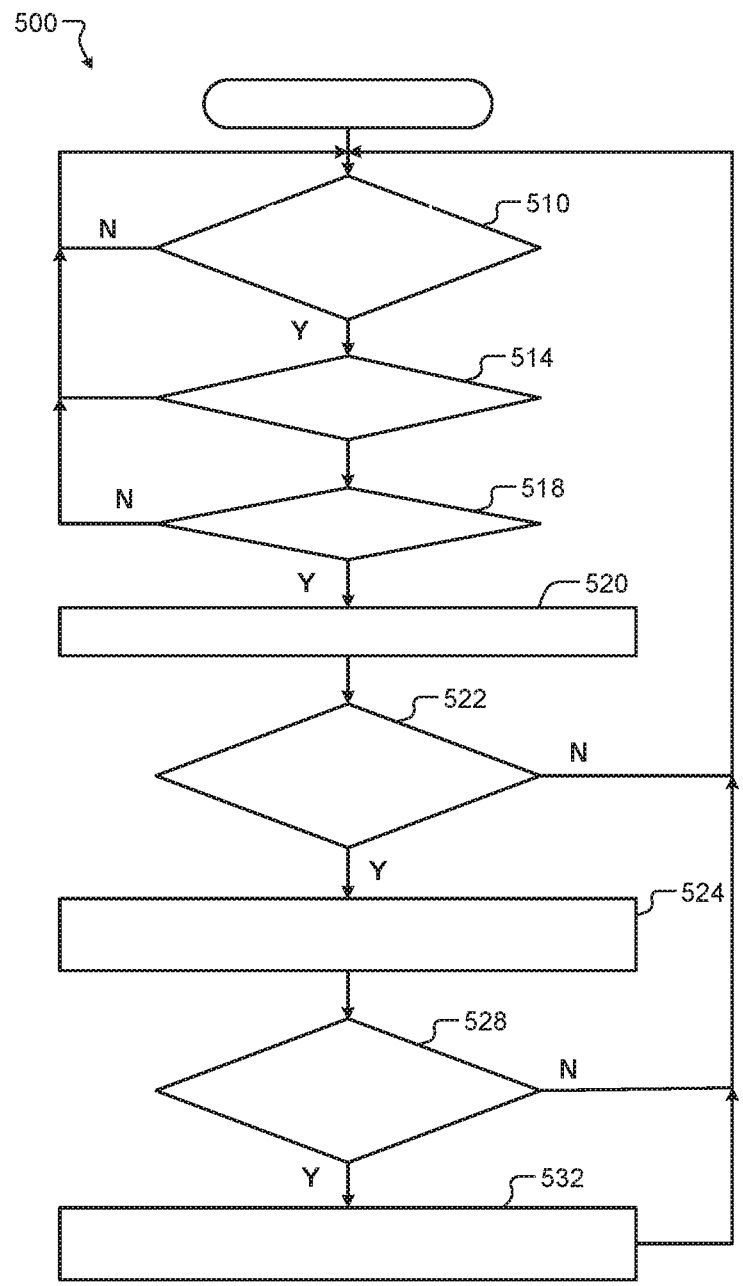
FIG. 6 is a flowchart of an example of a cruise control system using a combination of exhaust brake torque and mechanical brakes to maintain vehicle speed on a downhill grade according to the present disclosure.

Referring now to FIG. 6, a method 500 uses a combination of exhaust brake torque and mechanical brakes to maintain vehicle speed on a downhill grade using a cruise control system. At 510, the method determines whether the cruise control system and the exhaust brake torque system are both on. If 510 is true, method continues at 514 and determines whether the current vehicle speed ($V_{current}$) is greater than a vehicle speed setpoint ($V_{setpoint}$). If 514 is true, method determines whether the throttle is closed at 518. At 520, the method applies exhaust brake torque to slow the vehicle. At 522, the method determines whether the exhaust brake torque is greater than a predetermined exhaust brake torque setting $T_{setpoint}$.

If 522 is true, the method continues at 524 and applies the mechanical brakes. At 528, the method determines whether the exhaust brake torque is greater than $T_{setpoint}$ minus a predetermined exhaust brake torque value (A). If 528 is true, the method releases the mechanical brakes at 532. If 528 is false, the method returns to 510.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An exhaust brake torque system for a vehicle including an engine, comprising:
    a controller configured to determine a current exhaust brake torque and a maximum exhaust brake torque; and
    a display configured to display at least one of the current exhaust brake torque, the maximum exhaust brake torque and a percentage corresponding to the current exhaust brake torque divided by the maximum exhaust brake torque,
    wherein the controller is further configured to receive an exhaust brake torque setpoint and to selectively apply mechanical brakes of the vehicle in response to the current exhaust brake torque exceeding the exhaust brake torque setpoint.

2. The exhaust brake torque system of claim 1, further comprising:
    an engine speed sensor to determine an engine speed of an engine,
    wherein the controller is configured to calculate the current exhaust brake torque and the maximum exhaust brake torque in response to the engine speed.

3. The exhaust brake torque system of claim 1, further comprising:
    a pressure sensor configured to sense turbine inlet pressure,
    wherein the controller is configured to calculate the current exhaust brake torque and the maximum exhaust brake torque in response to the turbine inlet pressure.

4. The exhaust brake torque system of claim 1, further comprising:
    a pressure sensor configured to sense turbine inlet pressure; and
    an engine speed sensor to determine an engine speed of an engine,
    wherein the controller is configured to calculate the current exhaust brake torque and the maximum exhaust brake torque in response to the turbine inlet pressure and the engine speed.

5. The exhaust brake torque system of claim 1, further comprising:
    an engine speed sensor to determine an engine speed of an engine,
    wherein the controller further comprises a lookup table, and
    wherein the controller is configured to determine the current exhaust brake torque and the maximum exhaust brake torque by indexing the lookup table using the engine speed.

6. The exhaust brake torque system of claim 1, further comprising:
    a pressure sensor to determine a turbine inlet pressure,
    wherein the controller further comprises a lookup table, and
    wherein the controller is configured to determine the current exhaust brake torque and the maximum exhaust brake torque by indexing the lookup table using the turbine inlet pressure.

7. The exhaust brake torque system of claim 1, wherein the controller is further configured to selectively release the mechanical brakes of the vehicle in response to the current exhaust brake torque exceeding the exhaust brake torque setpoint minus a predetermined exhaust brake torque delta.

8. The exhaust brake torque system of claim 1, wherein the controller is further configured to control a vehicle speed of the vehicle to a vehicle speed setpoint of a cruise control system using exhaust brake torque of the exhaust brake torque system and mechanical brakes of the vehicle.

9. The exhaust brake torque system of claim 8, wherein the controller is further configured to:
  receive an exhaust brake torque setpoint; and
  when the vehicle speed is greater than the vehicle speed setpoint, selectively apply the mechanical brakes of the vehicle in response to the current exhaust brake torque exceeding the exhaust brake torque setpoint.

10. The exhaust brake torque system of claim 9, wherein the controller is further configured to selectively release the mechanical brakes of the vehicle in response to the current exhaust brake torque exceeding the exhaust brake torque setpoint minus a predetermined exhaust brake torque delta.

11. A method comprising:
  determining a current exhaust brake torque and a maximum exhaust brake torque;
  displaying at least one of the current exhaust brake torque, the maximum exhaust brake torque and a percentage corresponding to the current exhaust brake torque divided by the maximum exhaust brake torque;
  receiving an exhaust brake torque setpoint; and
  selectively applying mechanical brakes of a vehicle in response to the current exhaust brake torque exceeding the exhaust brake torque setpoint.

12. The method of claim 11, further comprising:
  determining at least one of an engine speed of an engine and a turbine inlet pressure; and
  calculating the current exhaust brake torque and the maximum exhaust brake torque in response to the at least one of the engine speed and the turbine inlet pressure.

13. The method of claim 11, further comprising:
  determining at least one of an engine speed of an engine and a turbine inlet pressure; and
  determining the current exhaust brake torque and the maximum exhaust brake torque by indexing a lookup table using the at least one of the engine speed and the turbine inlet pressure.

14. The method of claim 11, further comprising selectively releasing the mechanical brakes of the vehicle in response to the current exhaust brake torque exceeding the exhaust brake torque setpoint minus a predetermined exhaust brake torque delta.

15. The method of claim 11, further comprising controlling a vehicle speed of the vehicle to a vehicle speed setpoint of a cruise control system using exhaust brake torque of an exhaust brake torque system and mechanical brakes of the vehicle.

16. The method of claim 15, further comprising:
  receiving an exhaust brake torque setpoint; and
  when the vehicle speed is greater than the vehicle speed setpoint, selectively applying the mechanical brakes of the vehicle in response to the current exhaust brake torque exceeding the exhaust brake torque setpoint.

17. The method of claim 16, further comprising selectively releasing the mechanical brakes of the vehicle in response to the current exhaust brake torque exceeding the exhaust brake torque setpoint minus a predetermined exhaust brake torque delta.

* * * * *